(12) United States Patent  
Shiran

(10) Patent No.: US 7,954,152 B2  
(45) Date of Patent: May 31, 2011

(54) SESSION MANAGEMENT BY ANALYSIS OF REQUESTS AND RESPONSES

(75) Inventor: Tomer Shiran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 11/275,433

(22) Filed: Dec. 30, 2005

(65) Prior Publication Data

US 2007/0169170 A1 Jul. 19, 2007

(51) Int. Cl.
*G06F 21/00* (2006.01)
*G06F 21/20* (2006.01)
*G06F 21/22* (2006.01)

(52) U.S. Cl. ............ 726/22; 726/2; 726/4; 726/18; 726/26; 709/201; 709/212; 709/227; 709/229

(58) Field of Classification Search ............ 726/2, 3, 726/4, 5, 6, 12, 13, 14, 17, 19, 22, 23, 27; 709/201, 203, 206, 217, 218, 219, 224, 225, 709/226, 228, 229, 230, 231, 232; 713/151, 713/152, 153, 154, 168, 169, 170, 178, 501, 713/502; 707/1, 6, 7, 10

See application file for complete search history.

(56) References Cited

U.S. PATENT DOCUMENTS

| | | | | |
|---|---|---|---|---|
| 6,662,230 | B1 * | 12/2003 | Eichstaedt et al. | 709/229 |
| 2001/0054020 | A1 * | 12/2001 | Barth et al. | 705/37 |
| 2002/0032869 | A1 * | 3/2002 | Lamberton et al. | 713/200 |
| 2002/0116266 | A1 * | 8/2002 | Marshall | 705/14 |
| 2002/0147019 | A1 * | 10/2002 | Uhlik et al. | 455/452 |
| 2003/0046577 | A1 * | 3/2003 | Silverman | 713/200 |
| 2003/0061315 | A1 * | 3/2003 | Jin | 709/220 |
| 2004/0025055 | A1 * | 2/2004 | Hamadi et al. | 713/201 |
| 2004/0068573 | A1 * | 4/2004 | Corbeil | 709/229 |
| 2004/0111506 | A1 * | 6/2004 | Kundu et al. | 709/223 |
| 2004/0117654 | A1 * | 6/2004 | Feldman et al. | 713/201 |
| 2005/0071631 | A1 * | 3/2005 | Langer | 713/156 |
| 2006/0080383 | A1 * | 4/2006 | Hasson et al. | 709/203 |
| 2007/0078983 | A1 * | 4/2007 | Modrall | 709/226 |

* cited by examiner

*Primary Examiner* — Thanhnga B Truong
*Assistant Examiner* — Kenneth Chang
(74) *Attorney, Agent, or Firm* — Lee & Hayes, PLLC

(57) ABSTRACT

Session management by analysis of requests and responses is described herein. A gateway receives requests from a client system, forwards the same to a protected resource, and receives responses from the protected resource. The gateway includes a session management module that manages an authenticated session between the client system and the protected resource. In one aspect, the session management module receives responses that are labeled to indicate whether the requests corresponding to the responses are user-initiated or automatically-initiated. In other aspects, the session management module analyzes the requests to identify any periodic patterns appearing therein. The session management module identifies any requests that are part of a periodic pattern as automatically-initiated requests. In either case, the session management module maintains a timer for each session, and resets the timer when a user-initiated request is identified. Any session whose timer expires is terminated.

12 Claims, 11 Drawing Sheets

SESSION MANAGEMENT BY ANALYSIS OF REQUESTS AND RESPONSES

BACKGROUND

Wide area networks, such as the Internet, enable widespread publication and dissemination of information. Users who wish to login to a protected resource over such a wide area network typically authenticate themselves to that protected resource before being allowed access thereto. For example, the user may be asked to provide credentials, such as a username-password combination that is recognized as valid on the protected resource. By analyzing the username-password provided by the user, the protected resource can determine whether to grant or deny the user's request for access.

If the credentials provided by the user are valid and map to an actual identity, then the credentials are said to be authenticated. If the identity is allowed to access the protected resource, then the identity is said to be authorized to access the protected resource. If the user's credentials map to an identity that is allowed to access the resource, then a session is established for the user. The user may then access the protected resource using that session. Afterwards, the user is typically expected to explicitly log out of the session, or otherwise act affirmatively to terminate the session. However, users may often forget to log out or otherwise terminate the session, and instead may simply abandon the session, leaving it running, for example, unattended at a workstation. The session might thus become vulnerable to access by unauthorized persons, and the protected resource may be compromised by such unauthorized access.

To address the foregoing, protected resources may enact authentication polices. Such policies can specify a time limit on how long a user session can persist without some level of user activity occurring within that session. Such user activity can take the form of requests received in the context of that session. These time limits may help detect when a session has been abandoned, and can enable termination of such abandoned sessions to prevent compromising the protected resource.

Such time limit policies may assume that all requests associated with the session are user-initiated requests that should re-start the session timer. Increasingly, this assumption is no longer holding true. In a client-server environment, for example, client applications may automatically generate requests on behalf of sessions, whether or not the user is actively utilizing the session. These automatically-generated requests may continue to occur even if the user abandons the session. Thus, these automatically-generated requests may unwittingly defeat the above time limit policies, and may improperly extend the user's session.

SUMMARY

Systems and/or methods ("tools") are described that enable session management by analysis of requests and responses. A gateway receives requests from a client system, forwards the same to a protected resource, and receives responses from the protected resource. The gateway includes a session management module that manages an authenticated session between the client system and the protected resource. In one aspect, the session management module receives responses that are labeled to indicate whether the requests corresponding to the responses are user-initiated or automatically-initiated. In other aspects, the session management module analyzes the requests to identify any periodic patterns appearing therein. The session management module identifies any requests that are part of a periodic pattern as automatically-initiated requests. In either case, the session management module maintains a timer for each session, and resets the timer when a user-initiated request is identified. Any session whose timer expires is terminated.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTIONS OF THE DRAWINGS

The same numbers are used throughout the disclosure and figures to reference like components and features. The first digit in a reference number indicates the drawing figure in which that reference number is introduced.

DETAILED DESCRIPTION

Overview

The following document describes system(s) and/or method(s) ("tools") capable of many techniques and processes. The following discussion describes exemplary ways in which the tools enable session management by analysis of requests and responses. This discussion also describes ways in which the tools perform other techniques as well.

This document is organized into sections for convenience, with the sections introduced by headings chosen for convenience, but not limitation. First, Session Management by Aggregation of Requests is described in connection with FIGS. 1-3, which illustrate a related operating environment and process flows. Next, Server Labeling of Reponses to Requests is described in connection with FIGS. 4-6, which illustrate a related operating environment and process flows. Next, Injection of Client-Executable Code into Responses to Client Requests is described in connection with FIGS. 7-11, which illustrate a related operating environment and process flows.

Session Management by Aggregation of Requests

In some implementations, the tools can enable session management by aggregating requests for analysis and by identifying those requests that are automatically-generated. These implementations of the tools are now described in connection with FIGS. 1-3.

Figure 1:
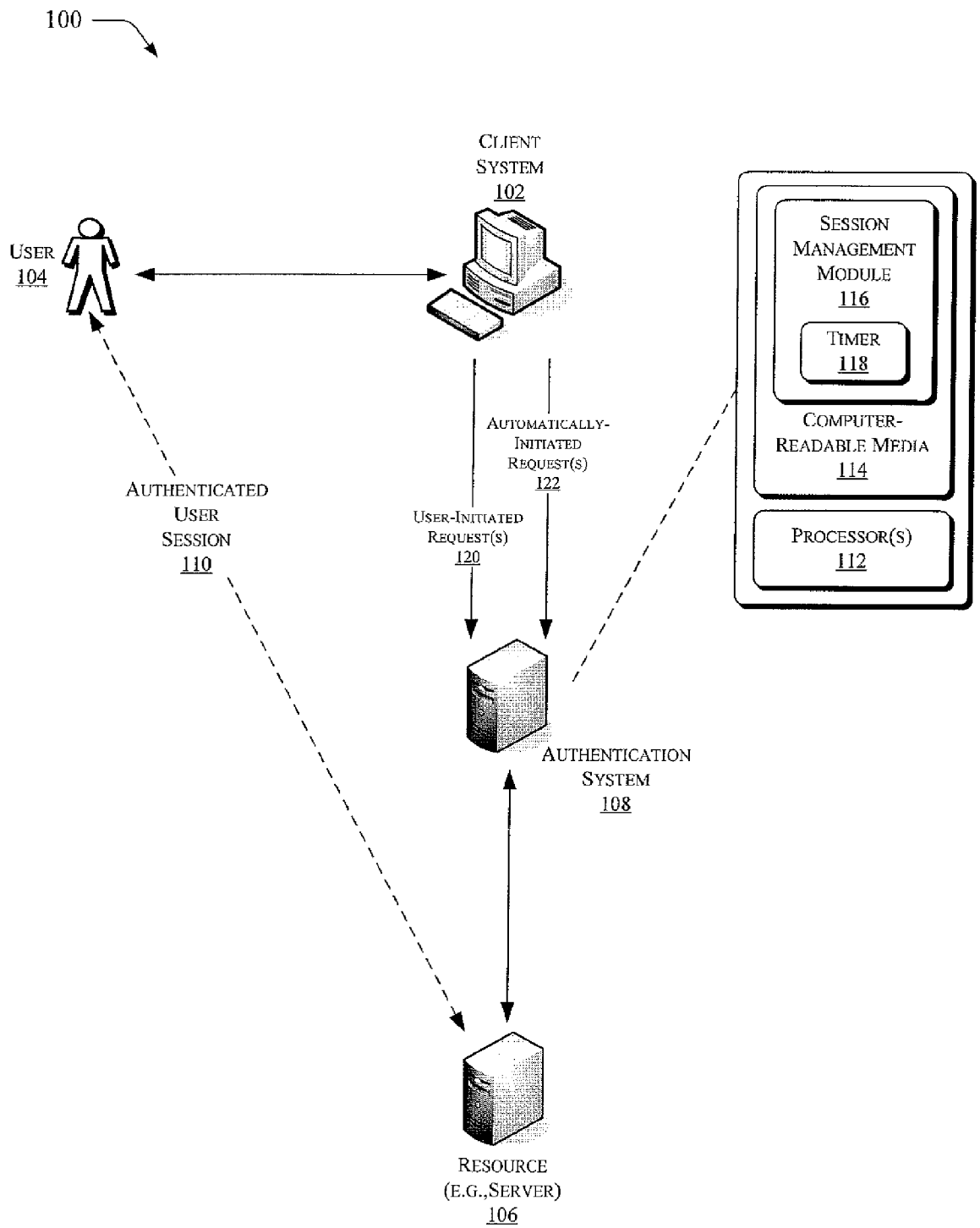
FIG. 1 is a block diagram of an operating environment for performing session management by aggregation of requests.

FIG. 1 illustrates an operating environment 100 for performing session management by analysis of requests and responses. More particularly, the operating environment 100 can enable session management by aggregation and analysis of requests to identify automatically-generated requests. The operating environment 100 can comprise a client system 102. The client system 102 can comprise a computing device, such as a cell phone, desktop computer, personal digital assistant, server, or the like. The client system 102 may be located in an Internet kiosk made available to the public at, for example, an airport, a library, or other public places.

Through the client system 102, a user 104 can request access to a protected resource 106. The protected resource 106 can be, for example, a web server hosting or publishing on-line content. The protected resource 106 can also be another type of server, or any other type of resource to which access is restricted. More particularly, the protected resource 106 may be a web server configured to enable users 104 in the form of employees to work remotely, by logging in to the web server from home to perform their work functions. Another example of the protected resource 106 might be a financial services website that is configured to allow users 104, for example clients, to access their accounts on-line. These examples are illustrative only, and do not limit possible deployments or implementations of the operating environment 100.

A gateway 108 can be operative to regulate access to the protected resource 106, such that all users 104 who access the protected resource 106 do so through the gateway 108. The gateway 108 may also be viewed functionally as an access control system. Thus, before being allowed access to the protected resource 106, the user 104 may be asked to establish that he or she is authorized to do so. Accordingly, the user 104 may present a login request to the gateway 108, and the gateway 108 may evaluate the login request to determine whether the user 104 has valid access to the protected resource 106. If so, the login request is granted; otherwise, the login request is denied. For example, the user 104 may present a username-password combination in connection with the login request, with the gateway 108 testing the provided username-password combination for validity. Other login authentication systems are possible, such as biometrics, client certificates, or other equivalent techniques.

Assuming that the user 104 has validly logged in, using whatever means supported by the gateway 108, a session 110 is established between the user 104 and the protected resource 106. For convenience of illustration, but not limitation, the session 110 is shown in FIG. 1 by a dashed line connecting the user 104 and the resource 106. However, it is understood that the session 110 is supported by the gateway 108 and/or the client system 102, such that any requests and/or responses pertaining to the session 110 pass through the gateway 108 and/or the client system 102.

While FIG. 1 shows only one session 110 and one user 104, it is understood that the operating environment 100 can accommodate any number of users 104 and respective client systems 102 and sessions 110. Also, for convenience of illustration and discussion only, the gateway 108 is shown as a separate entity from the protected resource 106. In some implementations, the gateway 108 may be integrated with, or consolidated into, the protected resource 106.

The gateway 108 may include one or more processor(s) 112 and computer-readable media 114. The processor 112 can be configured to access and/or execute the computer-readable media 114. The computer-readable media 114 can comprise or have access to a session management module 116, which may be implemented as a module, program, or other entity capable of interacting with a network-enabled entity. The session management module 116 can be configured to implement, for example, a time limit policy applicable to all sessions 110 with the users 104. The time limit policy may be implemented by a timer 118 or other equivalent device maintained by, for example, the session management module 116.

Under the terms of such a time limit policy, any session 110 that does not experience user activity over a pre-defined period of time is terminated. For example, this time interval can be set to five minutes, although any convenient timer period may be possible. For convenience of discussion, but not to limit possible implementations of the operating environment 100, an applicable time limit of X may be represented logically by the timer 118 having a duration of X time units.

User activity or user requests are represented generally in FIG. 1 at 120. User-initiated requests 120 include those actions or requests that are actively or actually initiated by the user 104. For example, user requests 120 may be generated as a result of keyboard events, mouse events (e.g., clicks, slides, or the like), verbal commands, or the like that are initiated by the user 104.

User-initiated requests 120 are distinguished herein from requests that are generated automatically and/or periodically on behalf of the user 104 by the client system 102, or by processes or applications executing thereon. These types of automatically or periodically initiated requests are represented generally at 122 in FIG. 1.

Generally speaking, for the purposes of a time limit policy as applied to the sessions 110, the automatically-initiated requests 122 are eliminated or ignored, such that occurrences of such requests 122 do not reset the timer 118. Put differently, if a session 110 generates only the requests 122 over the applicable time period, then the session management module 116 terminates the session 110.

On the other hand, occurrences of the user-initiated requests 120 cause the timer 118 to be reset. In other words, if at least one user-initiated request 120 occurs during the given time period, then the timer 118 is reset, updated, or refreshed, such that the session 110 is extended. Put differently, the automatic termination of the session 110 can be delayed by the period X of the timer 118.

The foregoing may be implemented, at least in part, by the session management module 116. An illustrative process flow that may be performed by the session management module 116 is now described in connection with FIG. 2.

Figure 2:
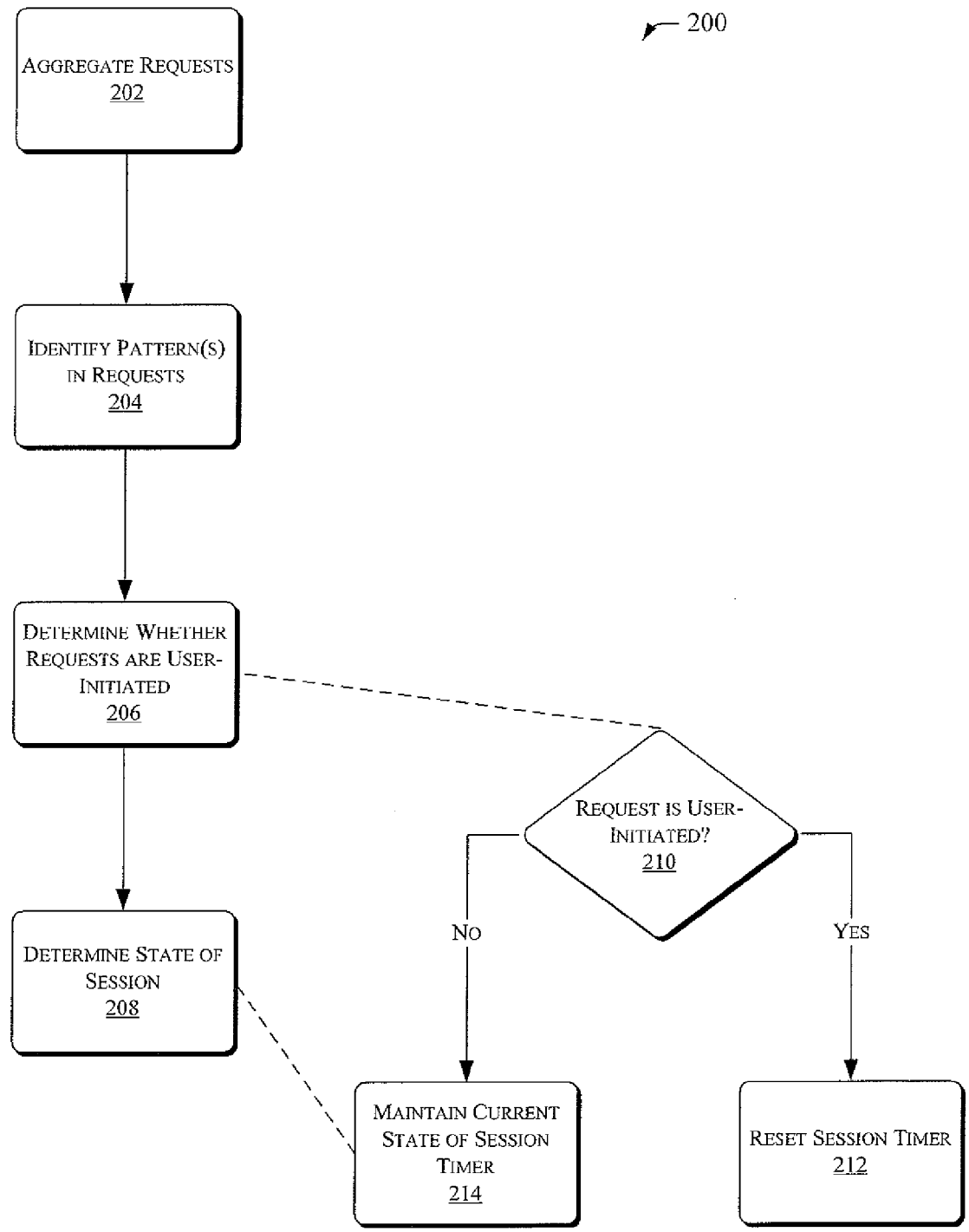
FIG. 2 is a flow diagram of a process for performing session management by aggregation and analysis of requests.

FIG. 2 illustrates a process flow 200 for performing session management by analysis of requests and responses. For convenience and ease of discussion, the process flow 200 is described here in connection with certain aspects of the operating environment 100. However, it is understood that the process flow 200 may be implemented on devices or components other than those shown in the operating environment 100 without departing from the spirit and scope of the description herein.

For example, the process flow 200 may be performed by a module such as the session management module 116 as implemented by the gateway 108. However, it is understood that components other than the session management module 116 could implement the process flow 200, at least in part, without departing form the spirit and scope of the subject matter taught herein. Also, the session management module 116 could be implemented, in whole or in part, with components other than the gateway 108 as described herein.

Turning to the process flow 200 in more detail, block 202 can aggregate a set of requests associated with one or more client systems 102 and/or sessions 110 to determine whether these requests correspond to user-initiated requests 120 or automatically-initiated requests 122. For example, block 202 may aggregate, organize, or correlate the requests by one or more properties common to one or more of the requests for the session 110.

Examples of the properties by which the requests can be aggregated can include a Uniform Resource Identifier (URI) as associated with the requests, verbs associated with the requests, parameters associated with the requests, sizes of the requests, cookies, or the like. It is understood that these properties can be aggregated separately, or in any combination. Thus, for example, a set of requests could be aggregated by URI and size.

Block 204 identifies any patterns that may exist in the aggregated requests. Typically, user-initiated requests 120 tend to be relatively random events, with no clear pattern emerging from a set of such requests. For example, keystrokes, mouse clicks, voice commands, or other similar user actions typically do not occur periodically and predictably.

On the other hand, a sequence of automatically-initiated requests 122 tends to exhibit a periodic pattern of events that recur over some interval. For example, an e-mail client executing on the client system 102 may poll an e-mail server on the protected resource 106 every 10 seconds. This results in a sequence of periodic request events that recur approximately every 10 seconds. Additionally, a given client system 102 may be executing multiple applications, each of which may generate respective streams of automatically-initiated requests 122. Viewed as a whole, the requests from these various streams may overlap or overlay one another as they leave the client system 102, and thus may appear misleadingly to be one consolidated stream.

It is understood that each request within such a periodic sequence need not occur at the exact same interval. For reasons such as server load, network transmission delays, or the like, some requests may be delayed or advanced somewhat relative to other requests in the periodic sequence. Nevertheless, analysis that accommodates or compensates for such factors may reveal that these seemingly unrelated requests are part of the same periodic sequence.

Block 206 determines whether the requests correspond to user-initiated requests 120 or automatically-initiated requests 122. Block 206 may, for example, take advantage of the foregoing general characteristics of user-initiated requests 120 as compared to automatically-initiated requests 122.

Block 208 determines a state of a session 110 based, at least in part, on whether the set of requests represents user-initiated requests 120 or automatically-initiated requests 122. Recall that a session 110 may have the timer 118, such that if no user-initiated requests 120 arrive from that session 110 before the timer 118 expires, then that session 110 can be terminated.

Without loss of generality, blocks 206 and 208 may be implemented by blocks 210, 212, and 214. Given a set of aggregated requests that are associated with a given session 110, block 210 can test whether at least one of these requests is a user-initiated request 120. If so, then block 214 can reset the timer 118 for that session 110. The term "reset" is understood to mean either resetting the timer 118 to its original value, or resetting the timer 118 to its full "idle timeout" value, minus the amount of time that has passed since the last user-initiated request. Otherwise, block 212 can maintain the current state of the timer 118 for that session 110, such that the timer 118 continues its current rundown, and is not reset, refreshed, or updated. Put differently, in these implementations, the detection of an automatically-initiated request 122 does not reset the timer 118.

Figure 3:
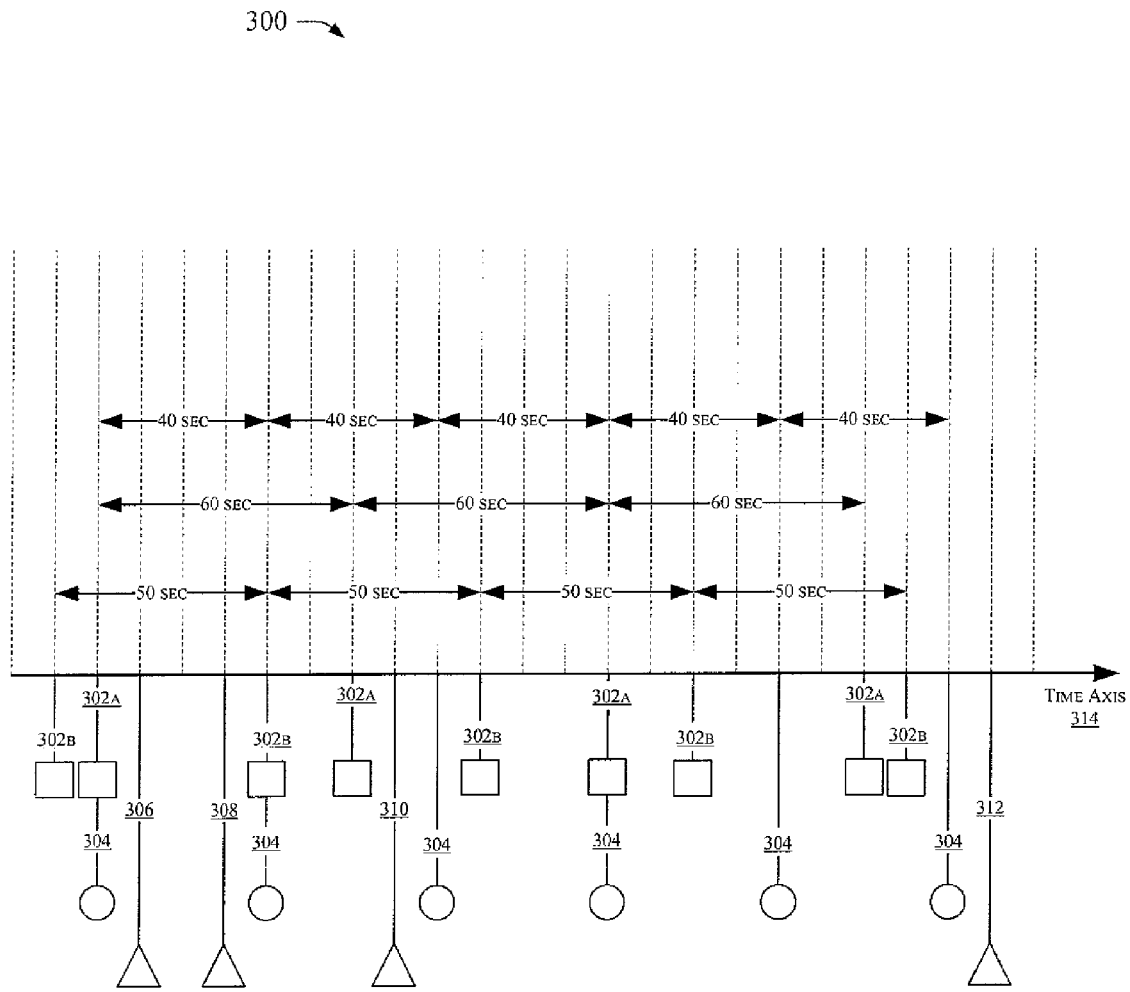
FIG. 3 is a block diagram of a sequence of requests that occur along a time axis.

A non-limiting example of the foregoing is presented in a sequence diagram as shown in FIG. 3, which is now discussed in detail.

FIG. 3 illustrates a sequence 300 of requests represented by forms of the reference numbers 302, 304, and 306. The requests are assumed to belong to a single given user session, and occur along a time axis 314. Only for convenience in describing FIG. 3, and not for limitation, requests 302 are assumed to represent example HTTP requests to a first URI, while the requests 304 are assumed to represent example HTTP request to a second URI. The requests 302 are symbolized in FIG. 3 by a square, and the requests 304 are symbolized by a circle.

In the example shown in FIG. 3, it is assumed that a set of requests has been aggregated by URI, resulting in the sequence 300. Directing attention to the requests 304 (the circles shown in FIG. 3), it is noted that these requests 304 occur approximately every 40 seconds. Because of this regular and periodic recurrence, these requests 304 are most likely not the result of explicit user activity, and can thus be classified as automatically-initiated requests 122. Therefore, these requests 304 can be eliminated as candidate requests for resetting the timer 118 for the session 110.

Directing attention now to the requests 302 (the squares shown in FIG. 3), a somewhat more interesting pattern emerges. A first subset of the requests 302, referenced as requests 302a, appear to be recurring every 60 seconds. A second subset of the requests 302, referenced as requests 302b, appear to be recurring every 50 seconds. Therefore, these requests 302 may result from two different automatic processes, with a first one of these automatic processes producing the requests 302a every 60 seconds, and a second one of these automatic processes producing the requests 302b every 50 seconds. Thus, the requests 302a and 302b can both be classified as automatically-initiated requests 122, and can be eliminated as candidate requests for resetting the timer 118 for the session 110.

Having eliminated the requests 302 and the requests 304 as possible candidates for resetting the timer 118, attention is now turned to the requests 306, 308, 310 and 312. The requests 306, 308, 310 and 312 are symbolized in FIG. 3 by triangle for convenience only to distinguish them from the requests 302 and 304. The graphical representation in FIG. 3 does not suggest that all of the requests 306, 308, 310 and 312 necessarily have common properties, or are associated with the same URI.

More particularly, in analyzing the requests 306, 308, 310 and 312, no particular pattern is readily apparent among them. Therefore, these requests 306, 308, 310 and 312 may be candidates for resetting the timer 118 for the session 110, unlike the requests 302 and 304 discussed above. Assuming that these requests 306, 308, 310 and 312 are not eliminated on some other basis, any of them could justify resetting the timer 118 for the session 110, as of the time that the selected requests 306, 308, 310 and 312 occurred. Thus, based on the foregoing, the requests 306, 308, 310 and 312 could be classified as a user-initiated request 120, as shown in FIG. 1.

In describing the foregoing, it is understood that the gateway 108 need not store the request history in its own local storage (i.e., in-memory or on disk). In some implementations, the gateway 108 may take advantage of other mechanisms to maintain this information or other similar state information. Such mechanisms Can include HTTP cookies that store a given level of request history, and that are stored on the client system 102. When the client system 102 submits a request in the context of a given session 110, it presents the cookie(s) for that session 110. In some implementations, there might be more than one cookie per session. The gateway 108 can obtain the request history for that session 110 by examining the cookie. This approach can save resources and reduce the complexity of the gateway 108.

In some implementations, a client system 102 may generate periodic requests as a keep-alive mechanism. In order to differentiate such requests from periodic requests 122 that are not user-initiated requests 120, some implementations of the client system 102 can label those requests accordingly, so that they are recognized by the gateway 108 as user-initiated requests 118. For example, some implementations of the client system 102 can add appropriate header information to its HTTP requests, and the gateway 108 can be configured to recognize this header information as indicating user-initiated requests 118.

Server Labeling of Reponses to Requests

In some implementations, the tools can enable session management by enabling a server or other protected resource to label responses to requests, so as to indicate whether the request was user-initiated or automatically-initiated. These implementations of the tools are now described in connection with FIGS. 4-6.

Figure 4:
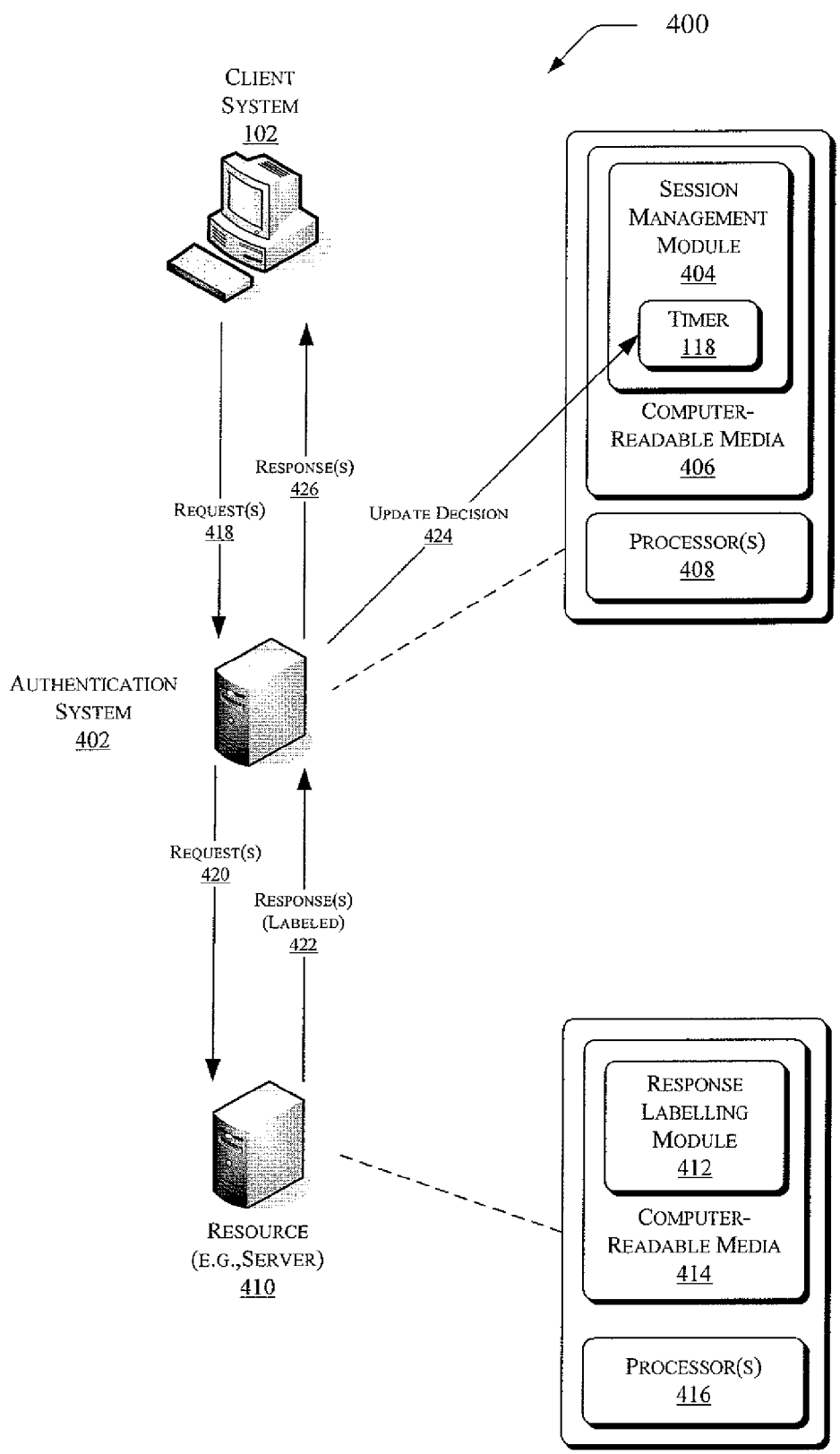
FIG. 4 is a block diagram of another operating environment for performing session management by analysis of requests and responses.

FIG. 4 illustrates another operating environment 400 for performing session management by analysis of requests and responses. More particularly, the operating environment 400 can perform session management by enabling a server or other protected resource to label responses to requests to indicate whether the request was user-initiated or automatically-initiated. Comparing the components shown in FIG. 1 with those shown in FIG. 4, the client system 102 can be the same in both FIG. 1 and FIG. 4.

A gateway 402 can be configured similarly to the gateway 108 shown in FIG. 1, with the additional capabilities discussed here in connection with FIG. 4. More particularly, the gateway 402 can include a session management module 404 that is configured to perform the described functions of the gateway 402.

The session management module 404 can be embodied in or be accessible from one or more computer-readable media 406, which may be executable or readable by one or more processors 408. The session management module 404 can also include a timer 118, similar to that discussed above in connection with FIG. 1. It is also understood that the gateway 402 can support user sessions 110 similar to those discussed above in connection with FIG. 1, although the user 104 and related session 110 are omitted from FIG. 4 for clarity. Aside from the foregoing, the gateway 402, the session management module 404, the computer-readable media 406, and the processor 408 may be similar or identical to corresponding elements shown in FIG. 1.

A resource 410 can be configured similarly to the resource 106 shown in FIG. 1, with the additional capabilities discussed here in connection with FIG. 4. More particularly, the resource 410 can include a response labeling module 412 that is configured to perform the described functions of the resource 410 within the operating environment 400. The response labeling module 412 can be embodied in or be accessible from one or more computer-readable media 414, which may be executable or readable by one or more processors 416. Aside from the foregoing, the resource 410, the response labeling module 412, the computer-readable media 414, and the processor 416 may be similar or identical to corresponding elements shown in FIG. 1. For example, the resource 410 may take the form of a server that is configured similarly to the server discussed above in connection with the resource 106.

The foregoing components are now discussed in connection with an illustrative but non-limiting data flow as shown in FIG. 4.

The client system 102 can generate a request 418 to the gateway 402. The operating environment 400 can classify the request 418, using the techniques shown in FIG. 4, as a user-initiated request 118 or an automatically-initiated request 120. The gateway 402 receives the request 418 and forwards the same to the resource 410. For convenience of reference only, the request 418 as forwarded to the resource 410 is shown as a request 420, although the request 418 and the request 420 may be similar or identical in terms of content.

The resource 410 services the incoming request 420 and provides a response thereto. The resource 410 can also determine whether the request 420 can be classified as a user-initiated request 118 or an automatically-initiated request 120. Thus, in the operating environment 400, the gateway 402 can defer to the resource 410 for this determination, taking advantage of the resource's knowledge of the possible requests 418 that may originate from the client system 102.

To illustrate the foregoing, assume that the resource 410 takes the form of a server, and assume that the server may support one or more applications on behalf of one or more client systems 102. In turn, these server applications may be configured to support a known set of requests 418/420 that may be received from the client system 102. Thus, the server, and/or applications executing thereon, may be in a favorable position to determine whether these incoming requests 418 likely originated from explicit user activity that may extend the session 110, or whether these requests were automatically-initiated without regard to actual user activity. In this manner, the gateway 402 may be isolated from the applications running on the server to some degree, and thus may be freed from maintaining extensive knowledge of the applications deployed behind the server. Thus, the gateway 402 may serve as a generic authentication component that can operate without having detailed knowledge of applications running on either the client system 102 or the resource 410.

Based on the foregoing determination, the resource 410 can formulate a response 422 to the request 420. The response 422 can include a label or other suitable identifier indicating whether the request 418/420 was a user-initiated request 118 or an automatically-initiated request 120. The gateway 402 and the resource 410 can establish a convention or protocol for labeling or otherwise suitably the response 422 so that the gateway 402 can tell what type of request 418/420 (i.e., user or automatic) drove the response 422. In implementations of the operating environment 400, the client system 102 need not be privy to this convention or protocol, and thus may be shielded from the details of any arrangement between the resource 410 and the gateway 402.

Turning to the gateway 402, having received the response 422, the gateway 402 can make a decision 424 on whether to update the timer 118 associated with the session 110. For example, if the resource 410 determined that the request 418/420 was user-initiated, and labeled the response 422 accordingly, the gateway 402 can reset or update the timer 118. Otherwise, if the resource 410 determined that the request 418/420 was automatically-initiated, and labeled the response 422 accordingly, the gateway 402 can maintain the timer 118 for the session 110 in its current state, and therefore not update or reset the timer 118.

The gateway 402 can transmit a response 426 to the client system 102. The response 426 as sent to the client system 102 may be similar to the response 422, aside from any labeling convention set between the gateway 402 and the resource 410. For example, the gateway 402 may formulate the response 426 based on the response 422, by stripping from the response 422 any labeling attached by the resource 410. As noted above, the client system 102 need not be aware of the arrangement between the gateway 402 and the resource 410. From the perspective of the client system 102, the response 426 corresponds to the request 418. Thus, the client system 102 need not be aware of processing performed by the resource 410 and/or the gateway 402 to service the request 418.

Figure 5:
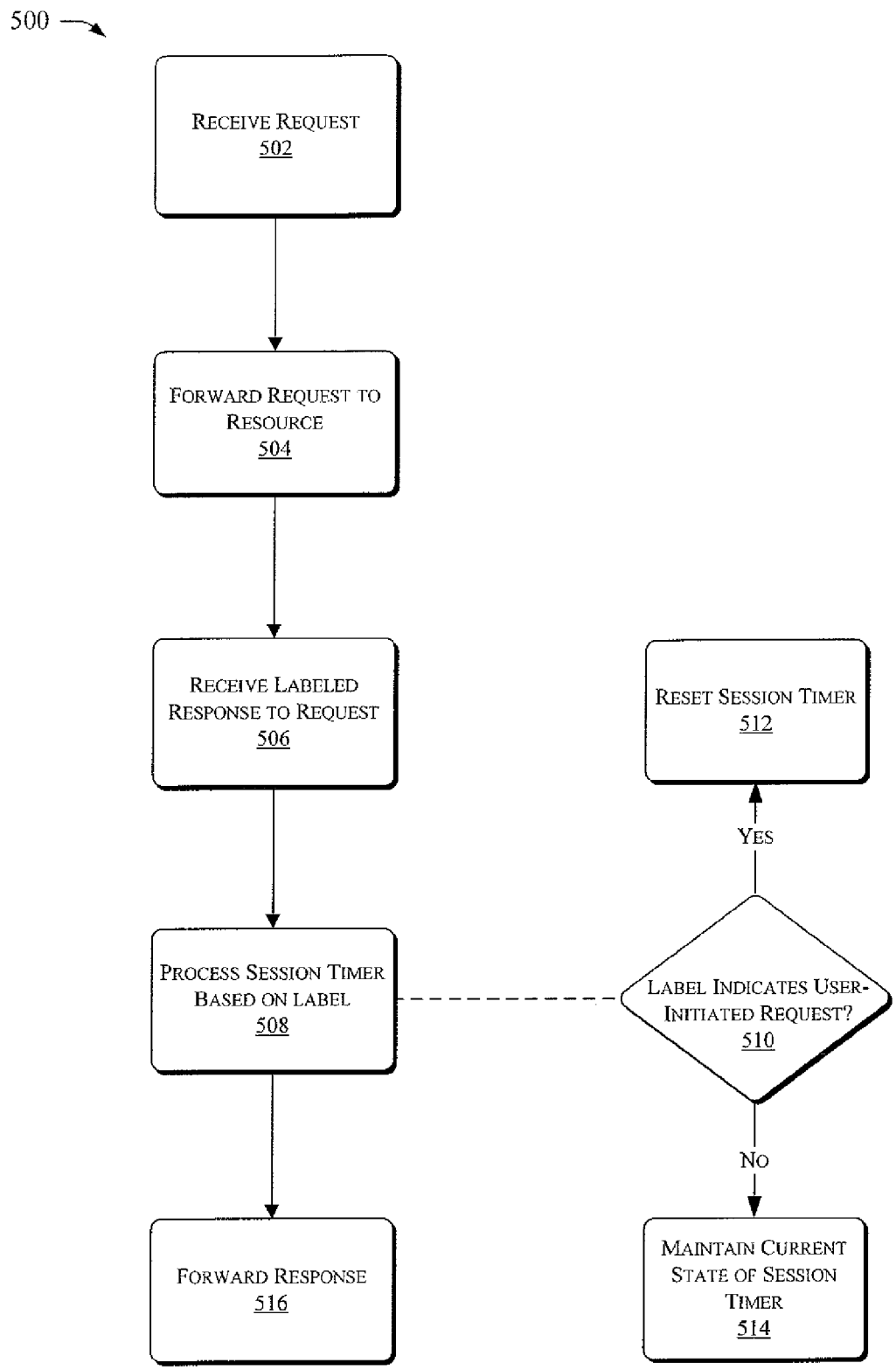
FIG. 5 is a flow diagram of a process for handling labeled responses to requests in connection with performing session management by analysis of requests and responses.

FIG. 5 illustrates a process flow 500 for processing requests in connection with session management by analysis of requests and responses. While the process flow 500 is described herein in connection with the gateway 402 and other components shown in FIG. 4 for convenience, it is understood that the process flow 500 may be performed by other components or entities without departing from the scope or spirit of the subject matter described herein. For example, at least some of the process flow 500 may be performed by the session management module 404.

Block 502 can receive a request for a service provided by a resource. For example, block 502 could receive the request 418 from the client system 102, and the request 418 could correspond to some service offered or supported by the resource 410.

Block 504 can forward the request received in block 502 to the resource for servicing. For example, the gateway 402 may forward the request 418 to the resource 410 in the form of the request 420.

Block 506 can receive a response to the request, with the response being labeled or otherwise appropriately identified so as to indicate whether the request received in block 502 resulted from explicit user activity or from automatic activity. For example, block 506 may receive the response 422 from the resource 410, after the resource 410 has determined whether the request 418/420 was user activity or automatic activity.

Block 508 can process the label associated with the response received in block 506 to determine how or whether to reset or update a timer associated with a user session. For example, block 508 can analyze the label associated with the response 422, and make the update decision 424 for the session timer 118 based on the label.

In more detail, block 508 can perform the processing shown in blocks 510, 512, and 514. Block 515 can evaluate whether the label indicates a user-initiated request. If so, block 512 can reset or update a session timer based on when the request occurred. The session timer can be, for example, the session timer 118. Otherwise, block 514 can maintain the present state of the session timer 118, and thereby not update or reset the session timer 118. Thus, block 514 eliminates automatically-initiated requests from causing a reset or update of the session timer 118.

In describing blocks 508-514 and other similar processing herein, it is noted that such description references evaluating whether the request is user-initiated, and thereafter resetting the session timer 118 accordingly. It is understood, however, that equivalent processing may be performed by evaluating whether the request is automatically-initiated, and thereafter not resetting the session timer 118.

Block 516 sends a response to the request received in block 502. For example, block 516 can send the response 426 to the client system 102, as shown in FIG. 4.

Figure 6:
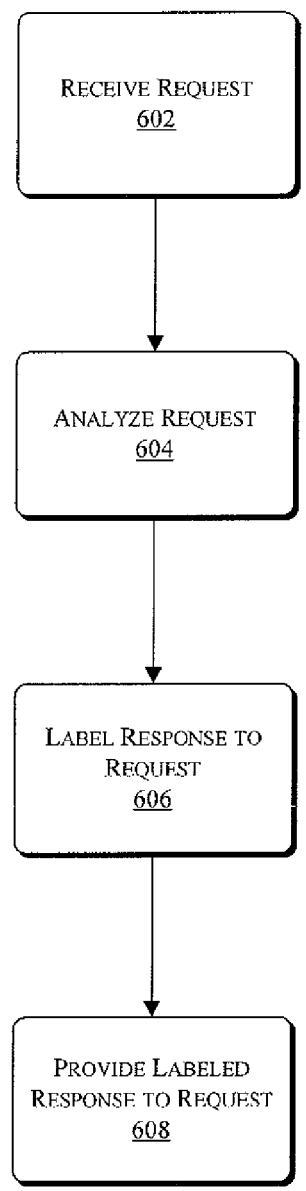
FIG. 6 is a flow diagram of a process for labeling responses to requests in connection with performing session management by analysis of requests and responses.

FIG. 6 illustrates a process flow 600 for processing requests in connection with session management by analysis of requests and responses. While the process flow 600 is described herein in connection with the resource 410 and other components shown in FIG. 4 for convenience, it is understood that the process flow 600 may be performed by other components or entities without departing from the scope or spirit of the subject matter described herein. For example, at least some of the process flow 600 may be performed by the response labeling module 412.

Block 602 can receive a request for a service offered or supported by a resource. For example, block 602 may receive the request 420.

Block 604 can analyze the request received in block 602 to determine whether that request resulted from an explicit user action or from an automatic action. For example, block 604 may analyze the request 418/420 as originated by the client system 102. As discussed above in connection with FIG. 4, since the request 418/420 is directed to the resource 410, the resource 410 may be in the best position to evaluate this request to determine whether it results from user activity or automatic activity.

Block 606 can label or otherwise identify the response to the request to indicate whether the request resulted from an explicit user action or from an automatic action. For example, block 606 can label or otherwise associate the response 422 to the request 418/420, as shown in FIG. 4.

Block 608 can provide a response to the request, with the response being labeled or otherwise identified to indicate whether the response was driven by a request that resulted from an explicit user action or from an automatic action. For example, block 608 can provide the labeled response 422 to the gateway 402 as shown in FIG. 4. Based on the labeling or identification, the gateway 402 can process the session timer 118 accordingly.

Injection of Client-Executable Code into Responses to Client Requests

In some implementations, the tools can enable session management by injecting client-executable code into a response provided to a client system. These e implementations of the tools are now described in connection with FIGS. 7-11.

Figure 7:
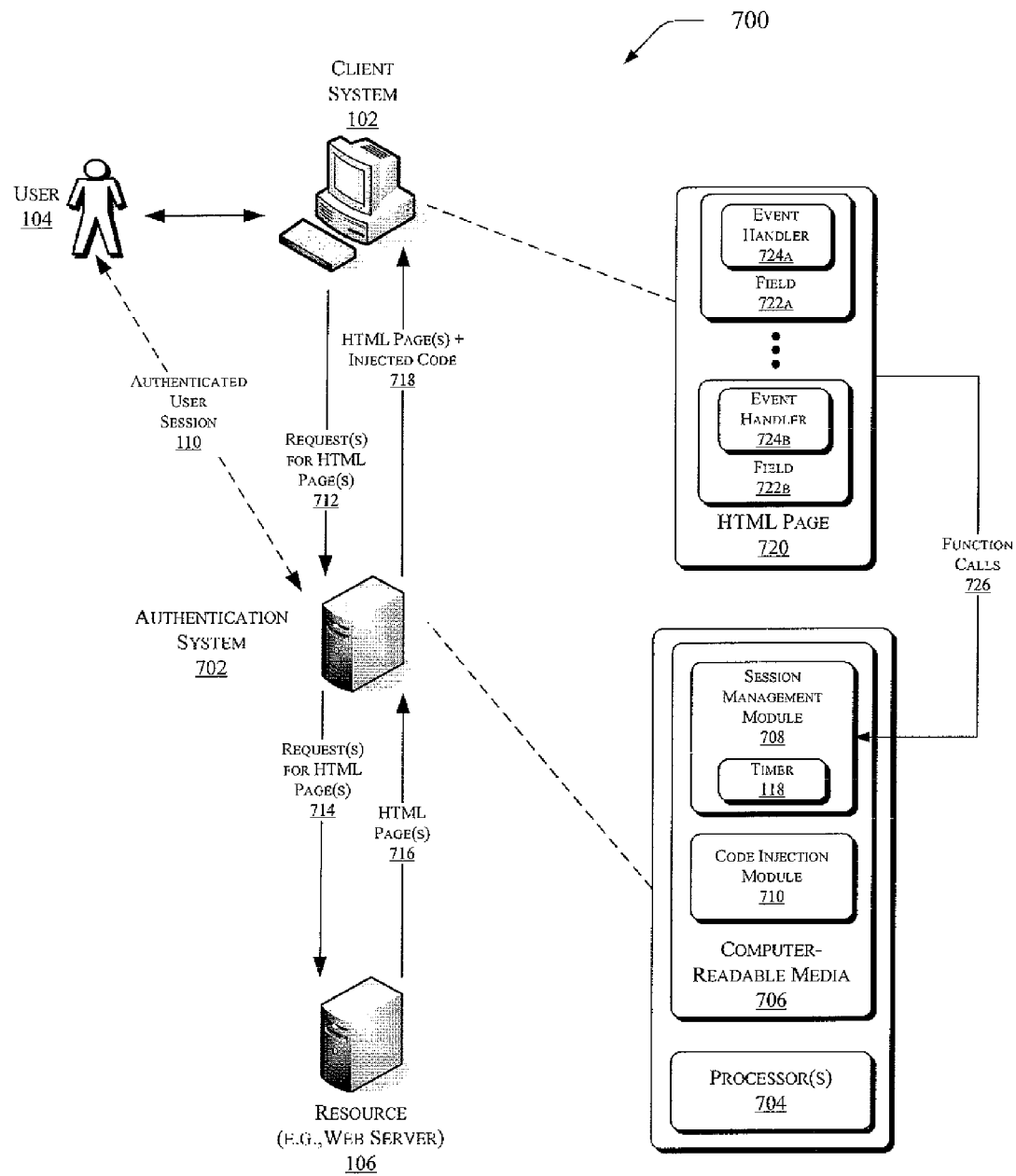
FIG. 7 is a block diagram of an operating environment for performing session management by analysis of responses to requests, where the responses are labeled by a protected resource who services the requests, such as a server.

FIG. 7 illustrates an operating environment 700 for performing session management by analysis of requests and responses. More particularly, the operating environment 700 can enable session management by injecting client-executable code into a response provided to a client system.

For convenience, the user 104 is carried forward from FIG. 1, as are the client system 102, the resource 106, and the session 110. Thus, all of the previous description relating to these components applies equally to the operating environment 700.

In the context of FIG. 7, the user 104 can request access to or can request content from the resource 106, using the client system 102. Before the user 104 is granted access to the resource 106, the user 104 is authenticated via a gateway 702. Assuming that the user 104 is authenticated and authorized to access the resource 106, the session 110 is established, as shown in dashed line connecting the user 104 and the gateway 702.

The gateway 702 can be similar to the gateways 106 and 410 shown, in FIGS. 1 and 4, respectively, with the added capabilities discussed here in connection with FIG. 7. Thus, the gateway 702 can include one or more processors 704 and computer-readable media 706. The gateway 702 can also include an implementation of a session management module 708 that may be similar to the session management module 404, with the added capabilities discussed herein. The session management module 708 can maintain a session timer 710, which may be similar to the timer 118 described above, but with the additional functions and capabilities described in connection with FIG. 7.

The gateway 702 can include a code injection module 712 that can be operative to load or inject client-executable code into content provided to the client system 102. The operation of the code injection module 712 is described in further detail below. In short, when the client system 102 executes the injected code, a signal can be sent back to the gateway 702. This signal enables the gateway 702 to perform enhanced session management.

The code injection module 712 and the session management module 708 can be stored on and/or executable from the computer-readable media 706. It is also noted that the code injection module 712 and the session management module 708 are shown separate in FIG. 7 only for ease of description and reference, but not to limit possible implementations of the operating environment 700. More particularly, the code injection module 712 and the session management module 708 could be integrated or consolidated into one common component without departing from the scope of the description herein.

The resource 106 can take the form of a webserver that is operative to serve content such as HTML pages upon request to users 104. If the user 104 wishes to see a given webpage, the user 104 submits a request 714 from the client system 102. The gateway 702 passes the request 714 through to the resource 106. The request 714 as submitted to the resource 106 is denoted as 716, for convenience of reference only. The resource 106 responds to the request 716 with, for example, an HTML page 718, which is passed to the gateway 702.

The gateway 702 injects client-executable code (or a reference to client-executable code) into the HTML page 718, resulting in the HTML page 720, which is sent to the client system 102 to fulfill the request 704. The code injected into the HTML page 720 is discussed in more detail below. The client system 102 then processes the HTML page 720, for example, to display a webpage requested by the user 104.

For convenience, the HTML page 720 as displayable by the client system 102 is referenced as 722. The displayable HTML page 722 typically contains elements originating in the HTML page 718. Examples of these elements can include one or more form elements or data entry fields, referenced generally as fields 724 in FIG. 7. Generally, the fields 724 enable the user 104 to enter data therein, for example, by typing at a keyboard provided by the client system 102. Two fields 724a and 724b are shown in FIG. 7. However, implementations of the displayable HTML page 722 could include any number of fields 724.

The displayable HTML page 722 can also include elements that result from executing the code injected by the gateway 702. Examples of such elements can include event handlers 726, which can be configured to respond to user input into corresponding fields 724. FIG. 7 shows two event handlers 726a and 726b, but implementations of the displayable HTML page 722 can include any number of event handlers 726. The number of event handlers 726 may vary in response to the number of fields 724 present in a given page 722. The event handlers 726 can be instantiated in response to executing the code injected by the gateway 702.

An example of illustrative operation of the event handlers 726 is now provided. When the user 104 clicks or otherwise activates one of the fields 724, and begins entering data therein, the corresponding event handler 726 corresponding to the selected field 724 can call a function provided by the gateway 702. Accordingly, FIG. 7 shows a function call 728. For convenience of illustration, the function call 728 is shown originating generally from the HTML page 722, although it is understood that the function call 728 may originate from one of the event handlers 726 in some implementations.

The function call 728 can serve a signal or mechanism for notifying the gateway 702 that the user 104 is actively using the session 110, although no user-initiated requests may otherwise be arriving from the client system 102 and/or the session 110. Given this notification, the gateway 702 can reset or refresh a timer 710 related to the session 110. This enables the session 110 to be maintained while the user 104 is, for example, interacting with the HTML page 722.

Without the notification signal or mechanism provide by the function call 728, the user session 110 may time-out and be terminated due to the timer 710 expiring while the user 104 is performing a lengthy activity that does not generate any user-initiated requests 120 to the gateway 702. For example, the user 104 may be typing a long e-mail, or completing a detailed form provided by a website. The keystrokes generated by the user 104 while performing these lengthy tasks may not immediately result in user-initiated requests 120 seen by the gateway 702. Therefore, the timer 710 may not be reset for some period of time, and if the timer 710 expires during that period, the session 110 may be terminated. In this case, the user 104 may lose his or her work, leading to a negative user experience.

To address the foregoing, the function call 728 can provide a signal or notification to the gateway 702 that the session 110 is still active, even though it may have been some time since the gateway 702 has received explicit user activity resulting in a user-initiated request 120. Therefore, the session timer 710 can be reset, keeping the session 110 alive until the user 104 completes the given task.

It is understood that the function call 728 provides an illustrative but non-limiting example of how to notify the gateway 702 that the user 104 is actively using the session 110, but is not presently generating user-initiated requests 120. Given the above description, other equivalent implementations may be possible without departing from the scope of the description herein.

Figure 8:
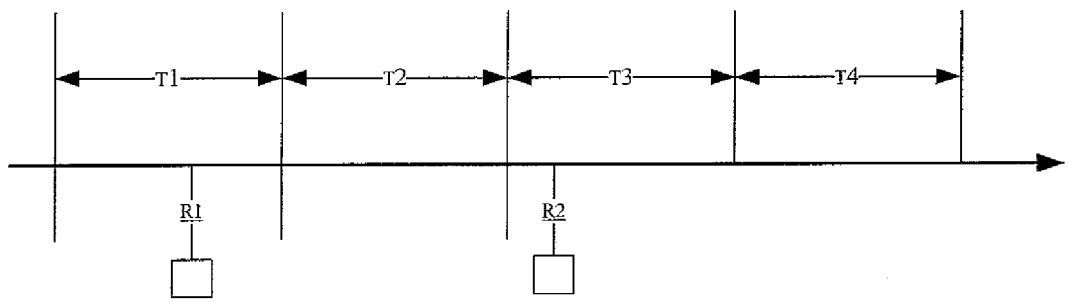
FIG. 8 is a block diagram of a sequence of requests related to managing sessions via code injection.

FIG. 8 illustrates an event sequence 800 related to managing sessions via code injection. Recall that the event handlers 726 on the client system 102 can send function calls 728 when the user 104 enters data into the fields 722. For convenience, these function calls 728 may be described as "keep alive" messages. However, implementations of the event handlers 726 need not send a keep-alive message for each key press that is detected. For example, the gateway 702 may inject code that sends a keep-alive message once every "t" seconds if the user 104 did some editing during a given period. Thus, FIG. 8 shows four illustrative time intervals $T_1$-$T_4$, each having duration "t" seconds.

In some implementations, t can be some percentage of the length of the idle timeouts that the gateway 702 enforces. In such implementations, t can be configured to be slightly less than 50% of the gateway's timeout period.

Referring to FIG. 8 in more detail, assume that the client system 102 initiated two requests, referenced as requests R1 and R2, that caused the event handlers 726 to send keep-alive messages at the end of period T1 and the beginning of period T3. So even though R1 and R2 were barely over t seconds apart, the keep-alive requests were 2 t seconds apart.

Turning to the code injection process in more detail, the HTML page 720 can take the following example form:

```
<html>
<head>
<title>Complaint Filing Form</title>
</head>
<body>
<form method="post" action="...">
Name:<br><input type="text" name="name"><br><br>
Email:<br><input type="text" name="email"><br><br>
Complaint:<br>
<textarea name="complaint" cols="60" rows="6"></textarea><br><br>
<input type="submit" value="Submit Complaint">
</form>
</body>
</html>
```

Figure 9:
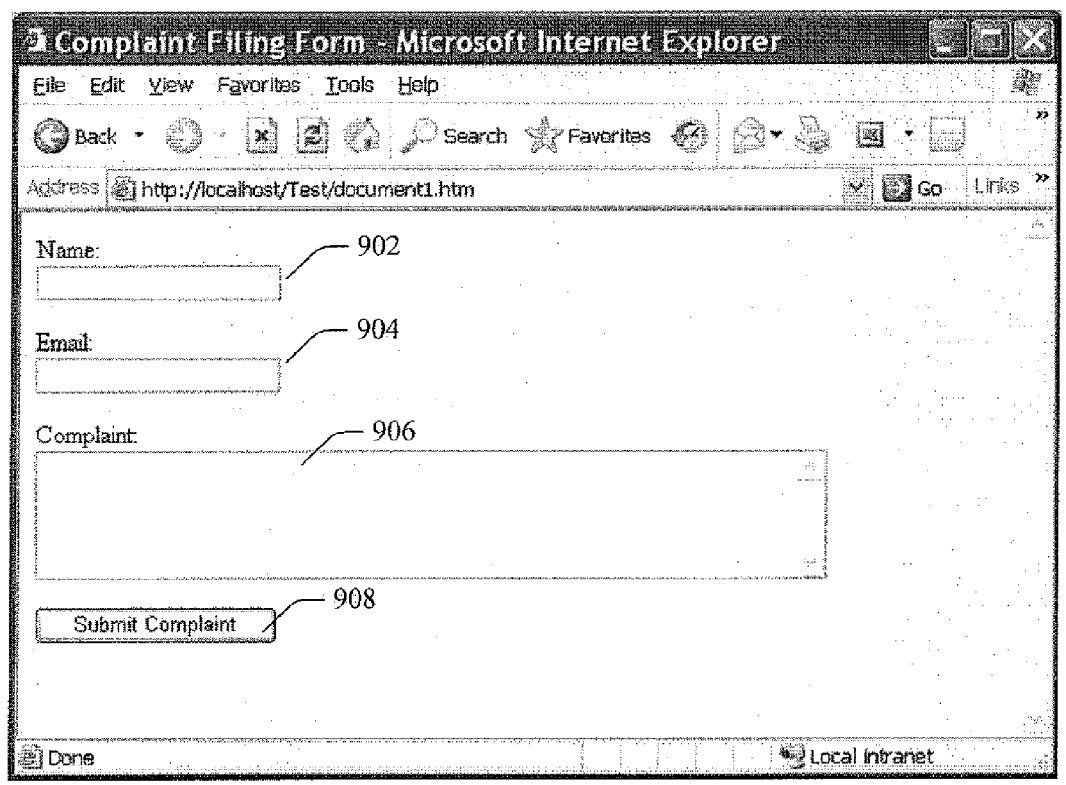
FIG. 9 is a block diagram of a form that may be displayed by a browser on a client system.

FIG. 9 illustrates a form 900 that might be displayed by a browser on the client system 102 in response to the above HTML. For example, the form 900 can provide an example of the displayable HTML page 722, which is shown in block form in FIG. 7. It is understood that the form 900 as presented in FIG. 9 is but one example, and that other forms 900 are possible without departing from the scope and subject matter described herein.

The form 900 includes at least three illustrative fields:
1. A "name" textbox 902;
2. An "email" textbox 904; and
3. A "complaint" text area 906.

The fields 902-906 can provide examples of the fields 722 shown in block form in FIG. 7. The form 900 can also include a "Submit Complaint" button 908.

To inject the keep-alive functionality into the HTML page 718, the gateway 702 could include a client-side script at the end of the document. This results in the HTML page 720, which can be represented by the following HTML code:

```
<html>
<head>
<title>Complaint Filing Form</title>
</head>
<body>
<form method="post" action="/cgi-bin/...">
Name:<br><input type="text" name="name"><br><br>
Email:<br><input type="text" name="email"><br><br>
Complaint:<br>
<textarea name="complaint" cols="60" rows="6"></textarea><br><br>
<input type="submit" value="Submit Complaint">
</form>
<script src="../keepalive.js"></script>
</body>
</html>
```

In the above example, an implementation of the gateway 702 included a reference to an external script named "keepalive.js" that is hosted by the gateway 702. An alternative implementation of the gateway 702 can inject the entire script in the actual body of the HTML page 720.

In either implementation of the gateway 702, the content of that script can take the following illustrative form:

```
function addLoadEvent(func) {
    var previousOnload = window.onload;
    if (typeof window.onload == "function") {
        window.onload = function( ) { previousOnload( );
            func( ); }
    } else {
        window.onload = func;
    }
}
function sendKeepAlive( ) {
    var xml = new ActiveXObject("Microsoft.XMLHTTP");
    xml.open("GET", KEEPALIVE_URL, false);
    xml.setRequestHeader("X-UserActivity", "1");
    xml.send( );
}
function checkActivity( ) {
    if (activityDetected) {
        sendKeepAlive( );
        activityDetected = false;
    }
}
function handleActivity( ) {
    activityDetected = true;
}
function installEventHandlers( ) {
    var forms = document.forms;
    // set up event handlers for all the forms
    for (var i = 0; i < forms.length; i++) {
        var elements = forms[i].elements;
        // set up an event handler for each element of the form
        for (var j = 0; j < elements.length; j++) {
            elements[j].onkeypress = handleActivity;
        }
    }
    // a keep-alive is sent every t seconds when there is activity
    setInterval("checkActivity( )", KEEPALIVE_INTERVAL);
}
var KEEPALIVE_INTERVAL = 15 * 1000; // 15 seconds
var KEEPALIVE_URL = ".../keepalive.htm";
var activityDetected = false;
addLoadEvent(installEventHandlers);
```

The above JavaScript code is described in sequence, as follows.

The addLoadEvent function can add a window.onload event handler 726, in addition to any existing window.onload event handlers 726. This can enable the injected script or code to execute one additional function call 728 once the HTML page 722 has been rendered on the client system 102, without affecting the existing functionality of the HTML page 718.

The sendKeepAlive function can send the actual HTTP keep-alive request, which can take the form of the function call 728. In this example, an XMLHTTP object is used, but any other mechanism can be used for this purpose. Note that an HTTP header called X-UserActivity can be added, with a value of 1. One purpose of this header is to indicate to the gateway 702, or to any other entity between the client system 102 and the resource 106, that this function call 728 indicates a user-initiated request 120.

The checkActivity function can check if any user activity was experienced during the latest period (see, e.g., FIG. 8). The checkActivity function can look at a flag such as the activityDetected flag in order to decide whether or not such activity took place. If there was user activity in the latest period, a keep-alive message in the form of the function call 728 can be sent, and the activityDetected flag can be reset.

The handleActivity function can be called when user activity occurs. In this example, this function is called whenever a keypress event occurs on one of the fields 902-906 of the form 900. A keypress event can occur each time the user 104 presses a key while one of the fields 902-906 are selected.

The installEventHandlers function can be called after a browser on the client system 102 loads the HTML page 720. This function can set up the "user activity detection" event handlers 726 on the fields 724 within the displayable HTML page 722. This function can then initiate a timer, which can then periodically invoke the checkActivity function every KEEPALIVE_INTERVAL milliseconds. This timer can facilitate sending periodic keep-alive messages as long as activity initiated by the user 104 is triggering events. This timer enables the operating environment 700 to avoid sending a keep-alive message for every user-initiated event (e.g., every key press). Thus, the timer described here in connection with the installEventHandlers function executing on the client system 102 is distinguished from the session timer 710 maintained on the gateway 702.

KEEPALIVE_INTERVAL can represent the length of a single period, such as ones of the intervals T1-T4 shown in FIG. 8. Implementations of the operating environment 700 can divide a timeline, such as that shown in FIG. 8, into static intervals T1-T4, and can send a keep-alive request in the form of the function call 728 at the end of each interval T1-T4 that has user activity.

KEEPALIVE_URL can represent the URL to which the client system 102 sends keep-alive requests. The gateway 702 can receive/intercept such requests as sent to this URL, and handle them as keep-alive requests.

It is understood that the foregoing description and related examples refer to HTML for convenience of discussion only, and not to limit possible implementations of the foregoing. For example, other programming or scripting languages or techniques, such as JavaScript™, VBScript™, or the like, may be appropriate in different implementations.

Having described the operating environment 700, process flow diagrams related to the operating environment 700 are now described.

Figure 10:
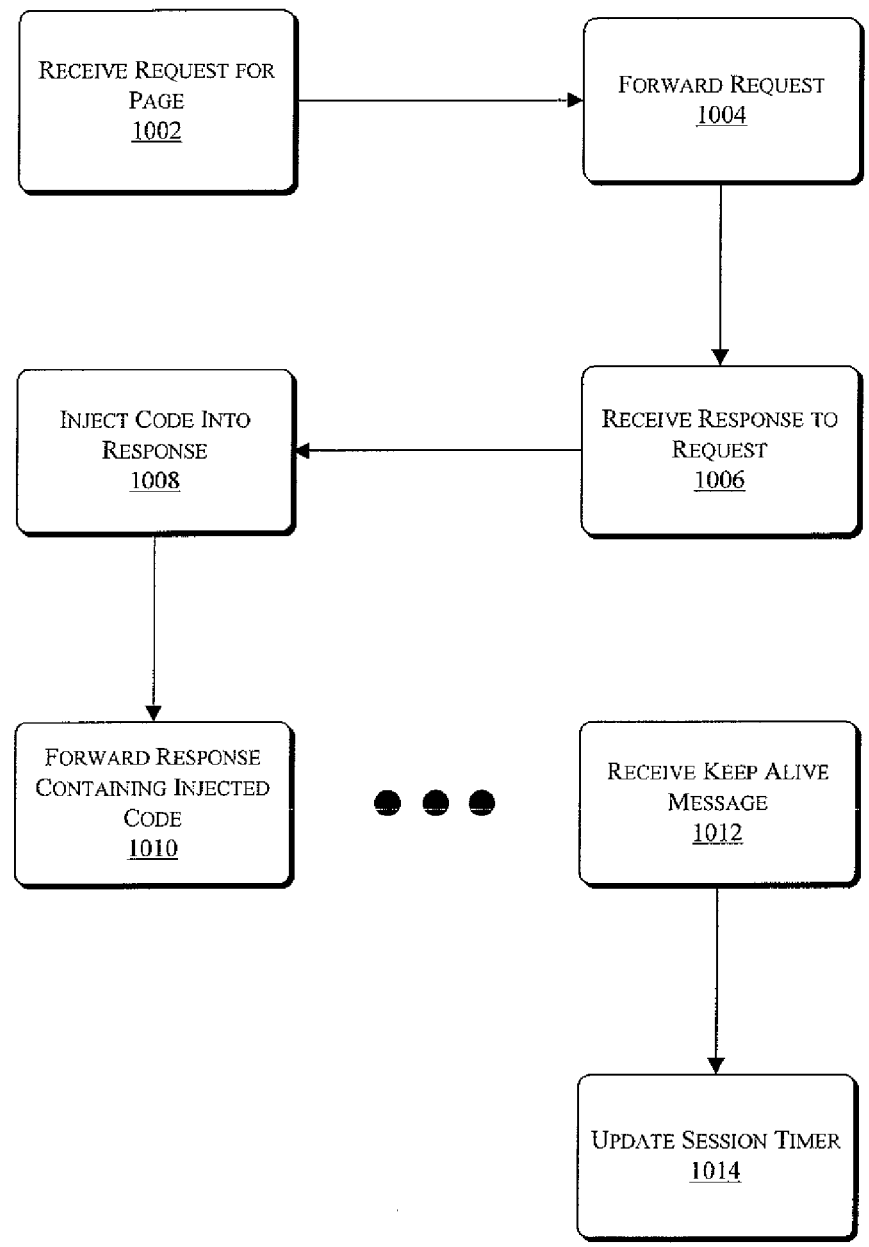
FIG. 10 is a flow diagram of a process for injecting code into responses to client requests.

FIG. 10 illustrates a process flow 1000 for detecting user activity via injection of code into responses to client requests. While the process flow 1000 is described herein in connection with the gateway 702 and other components shown in FIG. 7 for convenience, it is understood that the process flow 1000 may be performed by other components or entities without departing from the scope or spirit of the subject matter described herein. For example, at least some of the process flow 1000 may be performed by the code injection module 710 and the session management module 708.

Block 1002 can receive a request for a given resource. For example, block 1002 may receive the request from a client system, such as the client system 102 shown and discussed previously herein. The request received in block 1002 may take the form of the request 714 shown in FIG. 7. Additionally, the request may be a request for an HTML or other type of page.

Block 1004 can forward the request received in block 1002. For example, block 1004 may forward the request to a resource, such as the resource 106 shown and discussed previously herein. The request forwarded in block 1004 may take the form of the request 716 shown in FIG. 7. Recall that the resource 106 can take the form of a webserver. In this context, the request received in block 1002 may be a request for website content published and/or served by the resource 106.

Block 1006 can receive a response to the request that was forwarded in block 1004. For example, block 1006 may receive a response from the resource 106, in the form of the HTML page 718 shown in FIG. 7.

Block 1008 can inject code into the response received in block 1006. For example, block 1008 may inject code into the HTML page 718, resulting in the HTML page 720 as shown in FIG. 7.

Block 1010 can forward a response containing the injected code. For example, block 1010 can forward a response in the form of the HTML page 720 to the client system 102.

Blocks 1002-1010 can be performed by, for example, the code injection module 712 when the HTML page 720 is sent to the client system 102. Recall that the injected code can cause the client system 102 to send one or more "keep alive" messages, which can take the illustrative form of the function call 728. These keep alive messages typically would not begin arriving until sometime after the HTML page 720 is sent. Blocks 1012 and 1014 handle these keep alive messages and can be performed by, for example, the session management module 708.

Block 1012 can receive these "keep alive" messages from the client system 102, sent as a result of executing the code injected in block 1008. More specifically, the keep alive messages may be sent in response to the user 104 entering data into one or more fields 724.

Block 1014 can update or refresh a timer 710 associated with the user session 110, in response to receiving the "keep alive" message in block 1012. More particularly, block 1014 can recognize the "keep alive" message as an indication that the user 104 is actively using the session 110 in connection with the client system 102. Put differently, block 1014 can accept the "keep alive" message as indicating one or more user-initiated events 120, as shown in FIG. 1.

Figure 11:
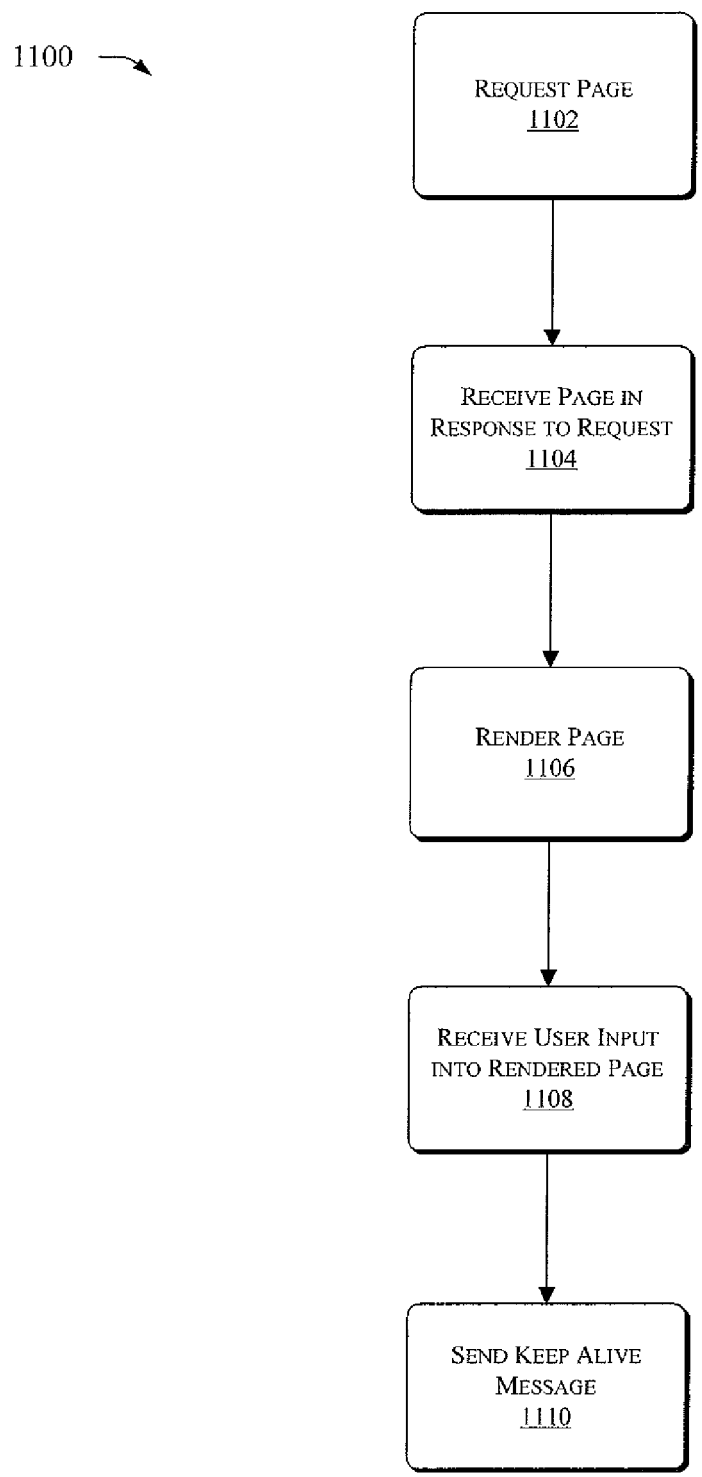
FIG. 11 is a flow diagram of a process for executing the code injected by the process shown in FIG. 10.

FIG. 11 illustrates a process flow 1100 for detecting user activity via injection of code into responses to client requests while the process flow 1100 is described herein in connection with the client system 102 and other components shown in FIG. 7 for convenience, it is understood that the process flow 1100 may be performed by other components or entities without departing from the scope or spirit of the subject matter described herein.

Block 1102 can request one or more pages of content. For example, block 1102 can request one or more HTML pages served by a resource 106, and this request may take the form of the request 714.

Block 1104 can receive one or more pages of content in response to the request of block 1102. For example, block 1104 can receive one or more HTML pages from the gateway 702, and this response may take the form of the HTML page 720.

Block 1106 can render the page received in block 1104. For example, block 1106 may render a page in the form of the HTML page 720, resulting in a display that may take the form of the displayable HTML page 722. Recall that the HTML page 720 can include one or more fields 724 that can be responsive to input from the user 104. Recall also that the gateway 702 can inject code into the HTML page 718, such that when block 1106 renders the HTML page 722, the event handlers 726 are loaded and operational.

Block 1108 can receive input into the page rendered in block 1106. For example, block 1108 can receive input from the user 104 as entered into the fields 724. Recall that the event handlers 726 can detect such input at, for example, the client system 102. In addition, block 1108 can detect user input such as clicks on buttons, links, or the like.

Block 1110 can send a "keep alive" message in response to the user input received in block 1108. For example, block 1110 can send a "keep alive" message, in the form of the function call 728, to the gateway 702, which in turn can recognize the "keep alive" message as an indication that the session 110 is active.

After performing block 1110, the process flow 1100 returns to block 1108 to listen for, receive, and analyze user input. Thus, it is understood that the process flow 1100 may loop indefinitely between blocks 1110 and 1108.

CONCLUSION

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain flow diagrams described and illustrated herein, it is noted that the processes and sub-processes depicted therein may be performed in orders other than those illustrated without departing from the spirit and scope of the description herein.

The invention claimed is:

1. A method comprising:
   receiving a request to establish an authenticated user session at a client device, the authenticated user session allowing access to a resource;
   establishing, by a processor configured with executable instructions, the authenticated user session so that a user can access the resource;
   applying, to the authenticated user session, a session timer enforcing a time limit policy that requires the authenticated user session to expire after the session timer reaches a timing limit;
   receiving a plurality of subsequent requests during the authenticated user session;
   detecting at least one periodic pattern from the plurality of subsequent requests, wherein, detecting the at least one periodic pattern includes aggregating a subset of the plurality of subsequent requests by at least one property and detecting a time pattern occurring in the subset;
   determining whether a subsequent request corresponds to a user-initiated request or an automatically-initiated request based on the at least one periodic pattern;
   responsive to a first determination that the subsequent request is the user-initiated request, resetting the session timer to extend the authenticated user session; and
   responsive to a second determination that the subsequent request is the automatically-initiated request, ignoring the automatically-initiated request such that a current state of the session timer is maintained.

2. The method of claim 1, further comprising identifying a plurality of periodic patterns from the plurality of subsequent requests.

3. The method of claim 1, wherein the first determination is based on detecting that the user-initiated request occurs non-periodically within the plurality of subsequent requests.

4. The method of claim 1, wherein the first determination is based on detecting that the user-initiated request does not occur within the at least one periodic pattern.

5. The method of claim 1, further comprising terminating the authenticated user session in response to expiration of the session timer.

6. The method of claim 1, further comprising:
   detecting a plurality of different periodic patterns from the plurality of subsequent requests, each periodic pattern corresponding to a different automatic process;
   aggregating a plurality of automatically-initiated requests associated with the plurality of different automatic processes; and
   eliminating the plurality of automatically-initiated requests as candidate requests that reset the session timer.

7. A system comprising:
   a processor;
   a memory, coupled to the processor, storing computer-executable instructions; and
   a session management module, implemented by the processor, that receives requests from a client system, manages an authenticated session between the client system and a protected resource, and maintains a timer applicable to the authenticated session, the session management module being configured to:
   detect at least one periodic pattern exhibited by two or more of the requests received during the authenticated session, wherein detecting the at least one periodic pattern includes aggregating the two or more requests based on at least one property and detects a time pattern based on the aggregation;
   identify the two or more requests as automatically-initiated requests provided by the client system on behalf of a user;
   identify at least one request that does not exhibit the at least one periodic pattern as a user-initiated request received during the authenticated session;
   reset the timer to extend the authenticated session in association with identifying the user-initiated request; and
   maintain a current status of the timer in association with identifying the automatically-initiated requests such that the automatically-initiated requests are ignored and the timer is not reset.

8. The system of claim 7, wherein the session management module is implemented in computer-readable storage media.

9. The system of claim 7, wherein the session management module is further configured to terminate the authenticated session if the timer expires before a user-initiated request is received by the session management module.

10. The system of claim 7, wherein the session management module is further configured to:
    detect a plurality of different periodic patterns from the requests, each periodic pattern corresponding to a different automatic process;
    aggregate a plurality of automatically-initiated requests associated with the plurality of different automatic processes; and
    eliminate the plurality of automatically-initiated requests as candidate requests that reset the timer.

11. One or more computer-readable media storing computer-executable instructions, that when executed by one or more processors, configure a computing system to perform operations comprising:
    receiving a request to establish an authenticated user session at a client device, the authenticated user session allowing access to a resource;
    establishing the authenticated user session so that a user can access the resource;
    applying, to the authenticated user session, a session timer enforcing a time limit policy that requires the authenticated user session to expire after the session timer reaches a timing limit;
    receiving a plurality of subsequent requests during the authenticated user session;
    detecting at least one periodic pattern from the plurality of subsequent requests, wherein detecting the at least one periodic pattern includes aggregating a subset of the plurality of subsequent requests by at least one property and detecting a time pattern occurring in the subset;
    determining whether a subsequent request corresponds to a user-initiated request or an automatically-initiated request based on the at least one periodic pattern;
    responsive to a first determination that the subsequent request is the user-initiated request, resetting the session timer to extend the authenticated user session; and
    responsive to a second determination that the subsequent request is the automatically-initiated request, ignoring the automatically-initiated request such that a current state of the session timer is not reset.

12. The one or more computer-readable media as recited in claim 11, further configured to perform operations comprising:
   detecting a plurality of different periodic patterns from the plurality of subsequent requests, each periodic pattern corresponding to a different automatic process;
   aggregating a plurality of automatically-initiated requests associated with the plurality of different automatic processes; and
   eliminating the plurality of automatically-initiated requests as candidate requests that reset the session timer.

\* \* \* \* \*